J. R. HYDE.
ASH SIFTING ATTACHMENT FOR STOVES.
No. 175,104. Patented March 21, 1876.
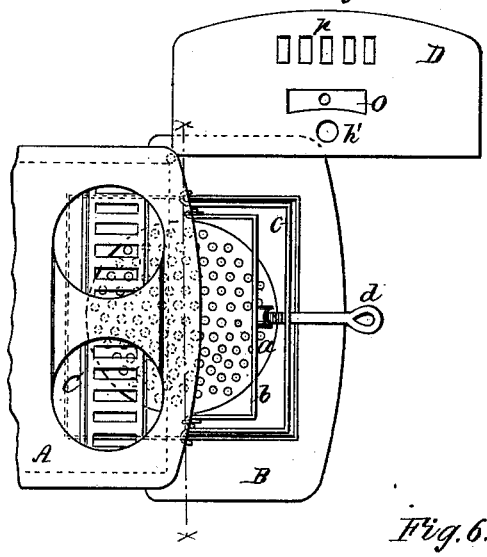
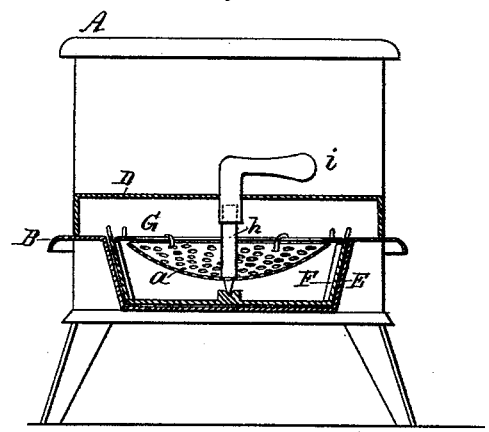
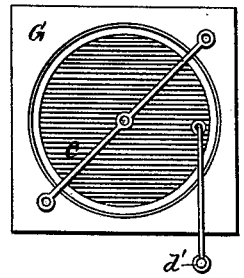
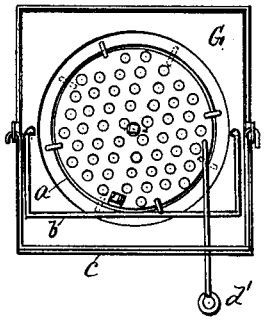
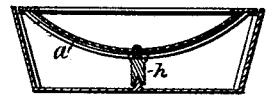
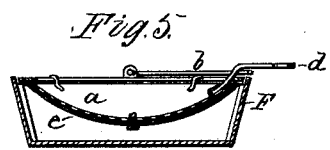
Witnesses.
Alexander Scott
M. A. Sherwood
Inventor
James R. Hyde
by J. D. Green Atty.

UNITED STATES PATENT OFFICE.

JAMES R. HYDE, OF TROY, NEW YORK.

IMPROVEMENT IN ASH-SIFTING ATTACHMENTS FOR STOVES.

Specification forming part of Letters Patent No. 175,104, dated March 21, 1876; application filed February 12, 1876.

*To all whom it may concern:*

Be it known that I, JAMES R. HYDE, of the city of Troy, in the county of Rensselaer and State of New York, have invented certain Improvements in an Ash-Sifting Attachment for Stoves; and the following is a specification thereof:

The nature of my invention relates to improvements in ash-pans and coal and ashes sifters combined and adapted to stoves; and it consists in the construction and arrangement of a combined ash pan and coal and ashes sifter fitted to the sunk hearth or ash-pit of a stove, the ash pan and sieve being each provided with a bail or handle, so that they may be separately carried or emptied without the use of a shovel or rake, all of which is hereinafter more fully described, reference being had to the drawings and letters of references marked thereon, making a part of this specification.

Figure 1 is a view of the front part of a cooking-stove, looking down upon the top, showing the boiler-holes, grate, hearth, swing-hearth, and the ash pan and sifter in position in the sunk hearth of the stove, the sifter and pan having bails $c$ and $b$. Fig. 2 is a cross-section of Fig. 1, taken at $x$ $x$, and showing the sifter mounted upon a central pivot. Fig. 3 is a plan view of the sifter and the frame set into the pan, having a bail, $c$, the sifter and frame having a bail, $b$. Fig. 4 is a central cross-section of the ash-pan, having a recessed frame, also having a central pivot. Fig. 5 is a central cross-section of the ash-pan, and having a concave sieve and a cross-bar, to which the sieve is mounted. Fig. 6 is a plan view of the under side of the sifter and its frame, also showing the cross-bar and shaker-handle. Fig. 7 is a central cross-section of the ash-pan and concave sieve and cross-bar, also having a central pivot bearing.

In the drawings, A represents the boiler-hole top of a cooking-stove; B, the hearth; D, the swing-hearth; C, the fire-grate; E, the sink in the hearth or ash-pit; F, the ash-pan; G, the sieve-frame; $a$, the sieve. The sunk part of the stove-hearth or ash-pit E of the stove should be of sufficient depth to receive the ash pan and sifter, or about four or five inches. The pan may be made of cast or wrought iron, and having ears for a bail, by which it can be transported from place to place, or there may be convenient handles for that purpose. There should be bearing-pieces in the corners of the ash-pan, or ledges upon two sides, to support the frame of the sifter. The frame G of the sieve should be as narrow at the sides as possible, and should be a little sloping inward, so that the coals and ashes will work onto the sieve when agitated. This frame is fitted into or onto the ash-pan, and is provided with a bail, $b$. There are pieces cast or riveted upon the frame G at the top and bottom, to hold the sieve $a$ in position, or it may rest upon the lower pieces and the cross bar $c$, as shown in Figs. 6 and 3, or it may be sustained in part by a central pivot, as in Figs. 2, 4, or 7, at $h$. This sieve $a$ is made concave on the upper side, as in Figs. 2, 5, or 7, and is made with light bars, as in Fig. 6, or of perforated metal. This sieve $a$ has a removable handle, as at $d$, Figs. 1 and 5, or stationary rods or handles, as at $d'$, Figs. 3 and 5. The frame G may have a bevel sink, as in Fig. 4, in which case the sieve may be either flat or concave; but I prefer the concave form, as it gathers all the coals and ashes to the center. This sieve is made to rotate by the handle or rod. This frame G and sifter $a$ may be fitted to the ash-pit of the stove, and used separate from or without the ash-pan F, if desired. The swing-hearth has a register-damper, $p$, also a hole, $h'$, to insert a shaker, $i$, Fig. 2, by which to rotate the sieve, if that form should be desired. If the rod $d'$ is used to rotate or agitate the sieve, it will lie on the hearth under the swing-hearth. To use this sifter, put the ash pan and sifter together, and put them into the ash-pit under the fire-grate; close the swing-hearth or door; dump the contents of the fire-chamber onto the sifter; then rotate the sieve until the coal is separated from the ashes; then open the door or swing-hearth, take the sieve by the bail, and empty the coal either into the fire-chamber or elsewhere. The ashes will be in the pan below the sieve; this may be emptied at pleasure by means of the bail or handle. This sieve $a$ and frame G are mounted together, and are readily handled by the bail, as shown in Figs. 1 and 3. The ash-pan can be used in the ordinary way without the sieve $a$ and the frame G, when desired, or both the pan and sieve may be used together, as before stated, and one or both are easily carried by the bail or handles.

Having thus described my invention and the manner of using it, what I claim as new, and desire to secure by Letters Patent, is—

1. The combination of the stationary frame G, provided with a bail or handle, with the sieve or grate $a$, concave on its upper face, and capable of a rotating motion on or within said frame G, upon which it is mounted when the ash-pit is closed, the whole adapted to a cooking or heating stove, substantially as and for the purposes described and set forth.

2. The combination of the sieve or grate $a$, stationary frame G, with the ash-pan F, said frame fitted to or upon said ash-pan, and each provided with a bail or handle, all adapted to a cooking or heating stove, substantially as and for the purposes described and set forth.

JAMES R. HYDE.

Witnesses:
 FRANK H. BRYAN,
 IRVING W. ROSE.